J. B. SLAWSON.

Fare-Box.

No. 8,988. Reissued Dec. 2, 1879.

Attest:
F. B. Brock
I. Y. Knight

Inventor:
J. B. Slawson
by R. Hannay
atty.

UNITED STATES PATENT OFFICE.

JOHN B. SLAWSON, OF NEW YORK, N. Y.

IMPROVEMENT IN FARE-BOXES.

Specification forming part of Letters Patent No. 69,263, dated September 24, 1867; Reissue No. 8,988, dated December 2, 1879; application filed October 13, 1879.

*To all whom it may concern:*

Be it known that I, JOHN B. SLAWSON, of New York, in the county of New York and State of New York, have invented certain new and useful Improvements in Fare-Boxes; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
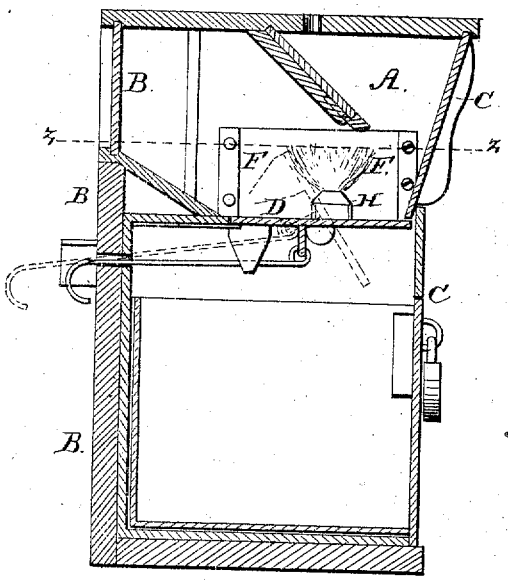
Figure 2:
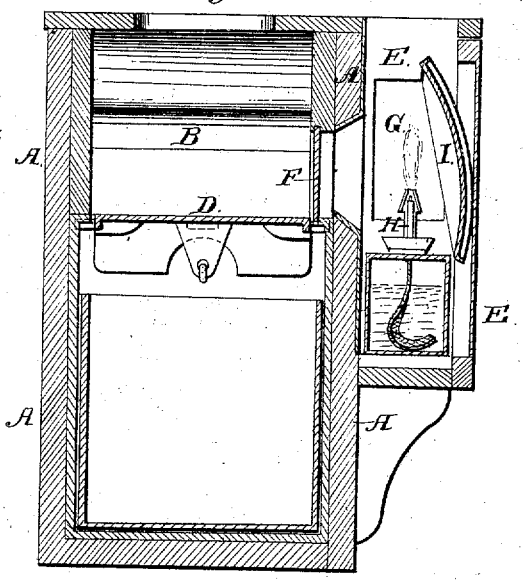
Figure 3:
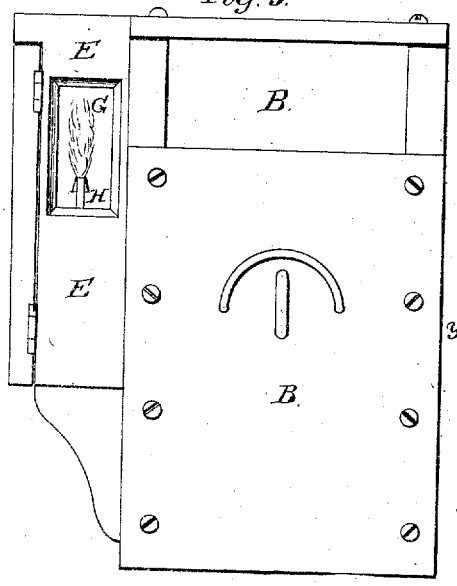
Figure 4:
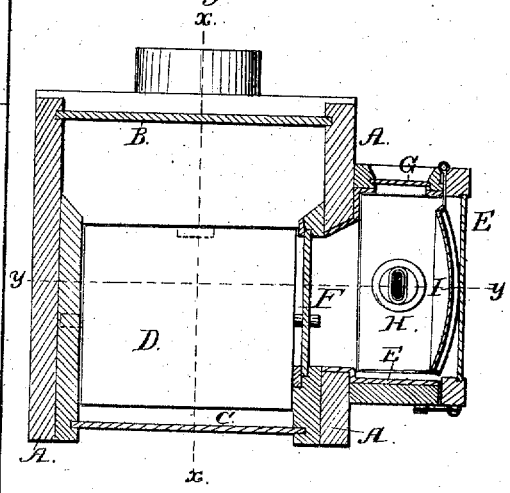

Figure 1 represents a vertical section from front to rear, of my improved fare-box, the plane of section being indicated by the line *x x* of Fig. 4. Fig. 2 represents cross-section of the same, the plane of section being indicated by the line *y y*, Fig. 4. Fig. 3 represents a front elevation of the same—that is to say, an elevation of the side next the driver. Fig. 4 represents a horizontal sectional view of the same, the plane of section being indicated by the line *z z* of Fig. 1.

The same letters of reference indicate the same parts.

This invention relates to a new and improved mode of lighting fare-boxes whereby the lamp is placed altogether out of the way of the fare-box, so as not to obstruct the inspection of the contents of the box, and so that light is thrown into the fare-box and upon the money-trap to completely illuminate the same.

The invention consists in combining, with a fare-box, a lamp and reflector so arranged that the light from the lamp is reflected directly upon the money-trap or arrest-platform, in order to sufficiently illuminate it, that the fare deposited may be properly inspected before being deposited in the money-drawer below.

It also consists in a new and improved mode of applying a lamp to the illumination of a fare-box.

This improvement consists in making the lamp-case and fare-box two separate and distinct devices, and then so combining the two that the light from the one is thrown directly upon the money-arrest of the other, that the fare may be inspected before being deposited in the drawer below.

The fare-box may be of any suitable construction, and this invention is not intended as an attachment to any one particular kind of fare-box, but may be used on fare-boxes of ordinary or suitable construction.

A A represent the side walls of a car or omnibus fare-box of suitable construction. B is the front, and C the rear or inside wall, of the same. D is the money-trap, which may be hinged or attached and operated in any suitable manner. The walls B and C are, above the money-trap, made of glass or other transparent material, so that the passengers, as well as the driver, may be enabled to inspect the contents of the box.

To one of the side walls A of the fare-box is attached a small box or apartment, E, the inner wall of which is provided with an opening directly opposite a corresponding opening formed in the side wall A, to which the box E is attached. This opening in the side wall A is closed by a glass plate, F, or by any other transparent or other material through which the light may be allowed to pass from chamber E to the fare-box. The front wall of the apartment E may also have a pane of glass, G, or its equivalent, to give a direct light to the driver.

A lamp, H, of suitable construction, is placed into the box or apartment E, and its light is thrown, by a strong reflector, I, of suitable construction, through the glass F upon the money-trap D, so that the money upon the same can easily be inspected from the inside and outside. If desired, a reflector may also be arranged opposite to the pane G. Such attachments E may be arranged on both or only on one side of the fare-box, as may be desired.

The top of the apartment E is open to allow the escape of smoke from the lamp.

That the smoke may be entirely kept out of the fare-box is another great advantage of my invention.

It will easily be seen that the driver's eyes will not be blinded by the light of the lamp H while he is inspecting the inside of the fare-box.

If desired, a pane may also be arranged on the inside of the apartment E, to throw light into the omnibus or car, or one may have an inside and another an outside pane, where two apartments, E, are used.

Any one of the outer walls of the apartment E may be hinged, so that it can be opened to remove the lamp for cleaning and other purposes.

What I claim as new, and desire to secure by Letters Patent, is—

1. The combination, with a fare-box, of a lamp and reflector so arranged that the light from the lamp is reflected on the stop or rest where the fare, after being dropped into the box, temporarily remains for inspection by the driver or passenger, before being deposited in the drawer or receptacle below, substantially as described.

2. The apartment E, provided with an opening for the passage of light toward the fare-box, and with a reflector, I, on the opposite wall, the lamp H being arranged between, substantially as described.

3. The apartment E, provided with openings for the passage of light toward the fare-box and toward the front, substantially as and for the purpose herein shown and described.

In testimony that I claim the foregoing I have hereunto set my hand this 22d day of August, 1879.

JOHN B. SLAWSON.

Witnesses:
F. B. BROCK,
S. E. CARPENTER.